United States Patent
Hong et al.

(10) Patent No.: US 10,174,487 B2
(45) Date of Patent: Jan. 8, 2019

(54) RATIONED OUTLET DEVICE

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Chunjie Hong, Fujian (CN); Lihong Hu, Fujian (CN); Shanlu Yuan, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 0 days.

(21) Appl. No.: 15/269,463

(22) Filed: Sep. 19, 2016

(65) Prior Publication Data

US 2017/0121952 A1    May 4, 2017

(30) Foreign Application Priority Data

Nov. 2, 2015    (CN) .......................... 2015 1 0732308

(51) Int. Cl.
| | |
|---|---|
| *E03C 1/04* | (2006.01) |
| *E03C 1/05* | (2006.01) |
| *G01F 15/00* | (2006.01) |
| *G05D 7/06* | (2006.01) |

(52) U.S. Cl.
CPC .......... *E03C 1/0404* (2013.01); *E03C 1/0412* (2013.01); *E03C 1/055* (2013.01); *G01F 15/003* (2013.01); *G05D 7/0623* (2013.01); *E03C 2001/0418* (2013.01)

(58) Field of Classification Search
CPC ........ E03C 1/04; E03C 1/0404; E03C 1/0412; E03C 1/055; G01F 15/003; G05D 7/0623
See application file for complete search history.

(56) References Cited

U.S. PATENT DOCUMENTS

| | | | |
|---|---|---|---|
| 6,997,064 B2* | 2/2006 | Bird .................. | G01F 1/115 73/149 |
| 8,162,236 B2* | 4/2012 | Rodenbeck ............ | E03C 1/057 239/390 |
| 8,365,767 B2* | 2/2013 | Davidson .............. | E03C 1/0404 137/559 |
| 2005/0133100 A1* | 6/2005 | Bolderheij ................ | E03C 1/04 137/801 |
| 2007/0152074 A1* | 7/2007 | Stowe .................... | E03C 1/055 236/12.1 |

(Continued)

*Primary Examiner* — J. Casimer Jacyna
(74) *Attorney, Agent, or Firm* — Rabin & Berdo, P.C.

(57) ABSTRACT

A rationed water outlet device with a variable water flow volume includes a process control module including an outlet valve, a flow meter, a control chip, and an encoder that includes an unlimited outlet gear and a plurality of rationed outlet gears which are switchably connected to the outlet valve to provide respectively, when engaged, an unlimited water flow volume or a selected rationed water flow volume from among a plurality of rationed water flow volumes, and that is electrically connected to the control chip to provide gear selection information; a volume option switch that is rotatably linked to the encoder for engaging the unlimited outlet gear or one rationed outlet gear; and an outlet control switch that is independent of the volume option switch and that is engaged after the volume option switch is engaged.

12 Claims, 8 Drawing Sheets

(56) References Cited

U.S. PATENT DOCUMENTS

2009/0293189 A1* 12/2009 Somerville ............... B05B 1/18
 4/597
2012/0234409 A1* 9/2012 Klicpera ............... B05B 12/004
 137/551
2014/0359935 A1* 12/2014 Veros ...................... E03C 1/055
 4/677

* cited by examiner

RATIONED OUTLET DEVICE

FIELD OF THE INVENTION

The present invention relates to an outlet device, especially to an outlet device that is automatically turned off when the outlet flow volume reaches to a certain value.

BACKGROUND OF THE INVENTION

In the modern society, people require higher to the life; baking, cooking, making tea or coffee are necessary in the daily life. Especially in the western-style baking, it has strict rules to the ingredients and the flow of water. User usually needs a measuring cup to get the water. It often happens that when you take the measuring cup under the tap to get the water, the measuring cup is filled up in one second when in high flow volume, it far exceeds the needed volume, which may waste the water. When in low flow volume, it gets slowly, during the process, user needs to take care of the volume in the cup to turn off the tap, it is a waste of time and labor. To solve the problems, a rationed tap exists in the market, this rationed tap can supply rationed flow volume according to the setting, the tap is turned off after the flow volume reaches to the preset value, so that the user needn't to take care of the volume. However, existing rationed tap is usually disposed with a flow adjusting portion, the user adjusts the proper flow volume and the water flows out. But misoperation may happen that the user adjusts the flow volume, but he doesn't get ready to get the water, water still flows out of the tap, it causes inaccurate of the water volume.

SUMMARY OF THE INVENTION

The present invention is provided with a rationed outlet device to solve the technical problems, it can switch in the rationed outlet and the unlimited outlet. The volume option and the outlet control use two independent switches to control that avoids misoperation.

The present invention solves the secondary technical problem is that it adds a temperature adjust dial rod, it improves the outlet variety of the outlet device. A temperature indication unit is further provided to indicate the water temperature by significant colors.

The present invention solves another technical problem is that it is configured with a mechanical outlet switch on the basis of rationed outlet, it can use the mechanical switch to control the outlet if the electric system is in the event of a failure.

The technical proposal of the present invention is that:

A rationed outlet device, wherein the outlet device comprises an outlet control switch, a volume option switch and a process control module;

the volume option switch is connected to an encoder, the encoder is disposed with an unlimited outlet gear and a plurality of rationed outlet gears;

the process control module comprises an outlet valve, a flow meter and a control chip;

the outlet control switch and the volume option switch are independently disposed, by switching the volume option switch to set the encoder in a proper outlet gear and operating the outlet control switch, water flows out of the tap.

In another preferred embodiment, the volume option switch is a rotating ring disposed at one side of the outlet port of the outlet device, the rotating ring is disposed with a volume dividing ruler, the outlet port of the tap is disposed with a marker.

In another preferred embodiment, when the volume option switch rotates to one side, the encoder rotates to the unlimited outlet gear; when the volume option switch rotates to the other side, the encoder rotates to one of the rationed outlet gears.

In another preferred embodiment, the volume dividing ruler is disposed with a scale corresponding to the unlimited outlet gear and a plurality of scales corresponding to the rationed outlet gear; when the rotating ring rotates to make one of the scales align with the marker, the corresponding outlet gear is selected.

In another preferred embodiment, the outlet control switch comprises a touch induction switch; when the encoder is disposed in any rationed outlet gear, the outlet valve is open by touching the touch induction switch, at the same time, the flow meter starts to count, when the flow volume reaches to the set value of the rationed outlet gear, the control chip controls the outlet valve to turn off.

In another preferred embodiment, the outlet control switch further comprises a temperature control device.

In another preferred embodiment, the temperature control device is a dial rod, the touch area of the touch induction switch is disposed in the dial rod; the control chip adjusts the mixing proportion of cool water and hot water by adjusting the position of the dial rod so as to control the outlet temperature.

In another preferred embodiment, when the encoder is situated in the unlimited outlet gear, the touch induction switch is invalid; the outlet valve is turned on by rotating the dial rod, the outlet temperature becomes higher by continuously rotating the dial rod.

In another preferred embodiment, a temperature indication unit and a temperature sensor are further provided, when the outlet temperature becomes higher, the color of the temperature indication unit transitions to red from blue gradually.

In another preferred embodiment, the outlet control switch further comprises a mechanical outlet switch; when the encoder is situated in unlimited outlet gear, the touch induction switch and the process control module are respectively invalid; the outlet flow volume and the outlet temperature are adjusted by operating the mechanical outlet switch.

In another preferred embodiment, the outlet device is disposed with an induction window, the induction switch is disposed at the position in the outlet device and corresponding to the induction window.

In another preferred embodiment, the outlet device is a tap or a shower head. Compared to the existing known technology, the technical proposal of the present invention has advantages:

1. The rationed outlet device of the present invention is provided that the volume option switch is linked to the encoder, the encoder is disposed with an unlimited outlet gear and a plurality of rationed outlet gears. Therefore, user can switch in the rationed outlet and unlimited outlet mode by putting the volume option switch to corresponding gear. The volume option and the outlet control use two independent switches to control, so that user needs to turn on the outlet control switch after selecting the volume, this two-step operation efficiently avoids misoperation.

2. The rationed outlet device of the present invention can be an electric device, the encoder sends the volume the user selected to the control chip, when the user operates the outlet controls switch, the electromagnetic valve turns on to outlet waterway, at the same time, the flow meter counts, when it counts to the target flow volume, the control chip controls to turn off the electromagnetic valve. The pure electrically operation method makes sure the accuracy of the flow meter.

Besides, the temperature adjust dial rod is configured on the basis of the rationed outlet, it improves the outlet variety of the outlet device. When the user selects the unlimited outlet gear, the control chip controls the temperature control unit to be valid; the user rotates the temperature adjust dial rod, the outlet temperature rises, it satisfies the need of warm water, thus enriching the experience. Moreover, with the temperature indication unit, it applies significant colors to indicate the outlet temperature, user can directly read the present temperature, it also makes the appearance attractive.

3. The rationed outlet device can be a device combined with electricity and machinery, when the user selects the rationed outlet gear, the outlet device applies with above mentioned electrical counting method. When the user selects the unlimited outlet gear, the electric system is shut down, user can control the outlet valve to turn on or turn off by rotating the mechanical switch, the user can also control the outlet temperature by operating the mechanical switch. It is in accord with user's traditional habit, it also makes sure that the flow volume and the outlet temperature can be controlled by the mechanical switch if the electric system is in an event of a failure.

4. The rationed outlet device of the present invention is provided that the outlet controls switch is applied with a touch induction switch, the touch area is small, user needs to touch correctly to make water flow out, it avoids misoperation.

5. The rationed outlet device of the present invention can be a tap or shower head or other general outlet devices, the present invention has wide applicability.

DETAILED DESCRIPTION OF THE EMBODIMENTS

Figure 1:
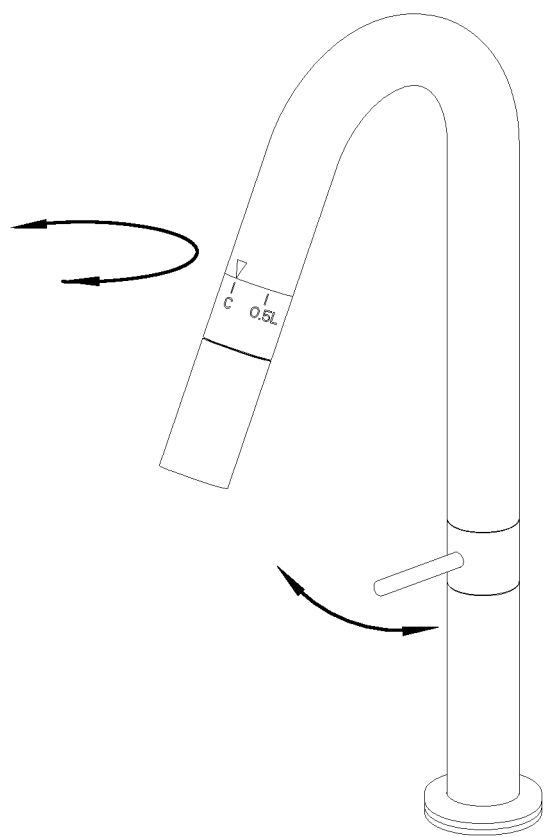
FIG. 1 illustrates a schematic diagram of a kitchen tap of the first embodiment of the present invention.
Figure 2:
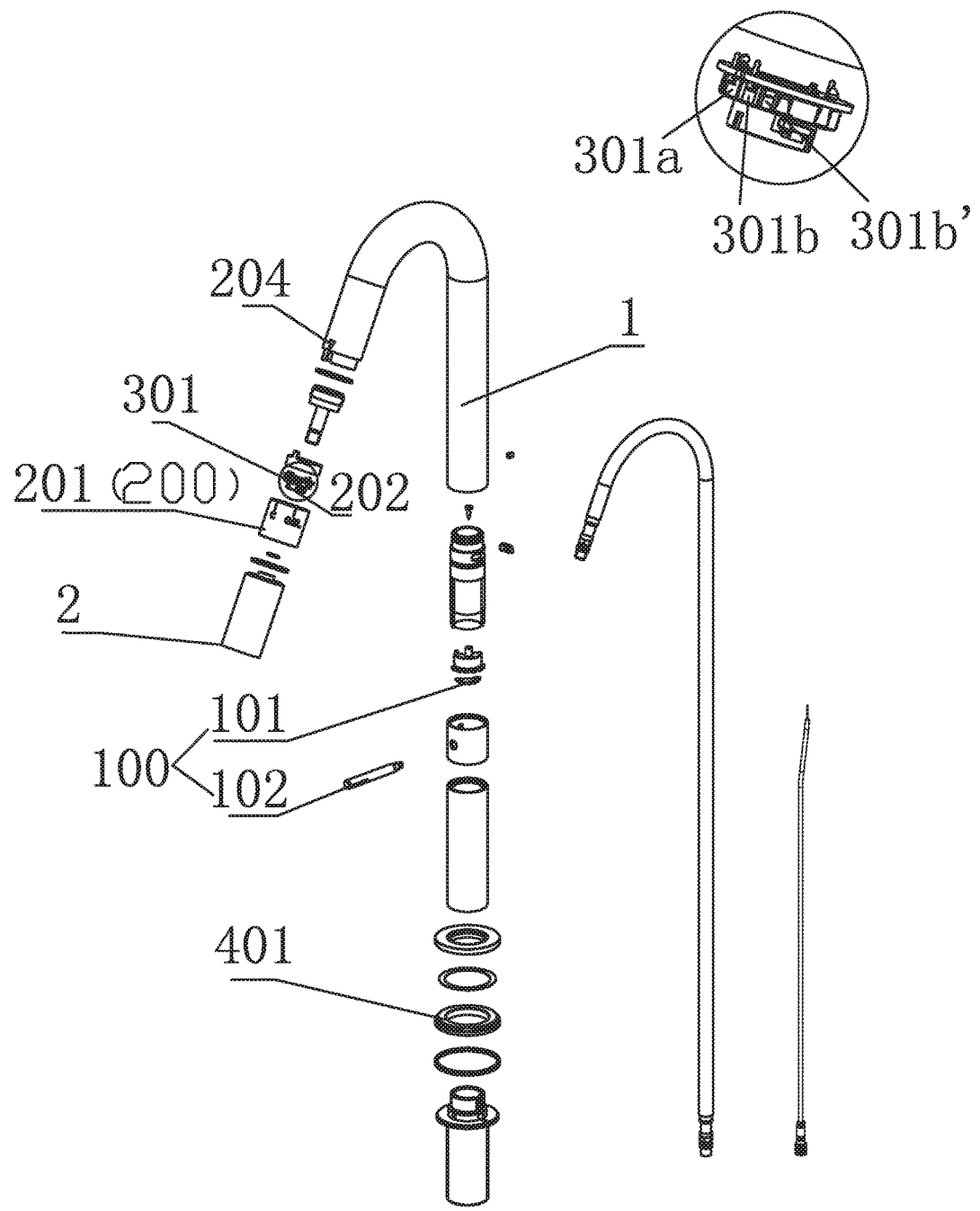
FIG. 2 illustrates an exploded and schematic diagram of the main body of the kitchen tap of the first embodiment of the present invention.
Figure 3:
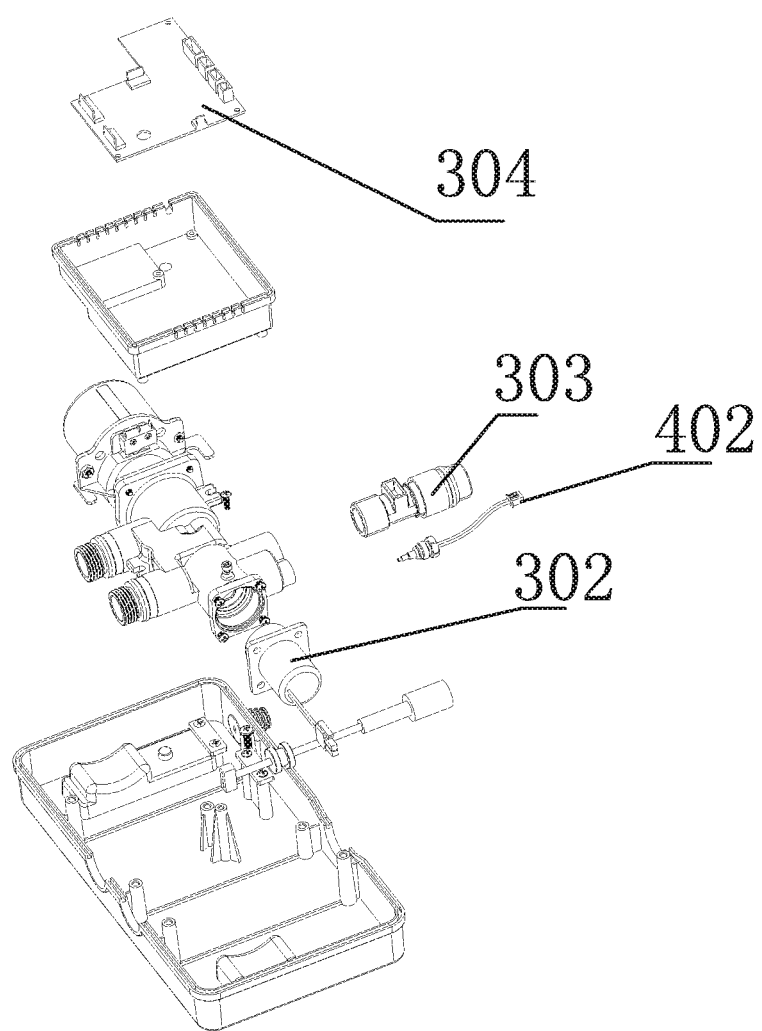
FIG. 3 illustrates an exploded and schematic diagram of the process control module of the kitchen tap of the first embodiment of the present invention.
Figure 4:
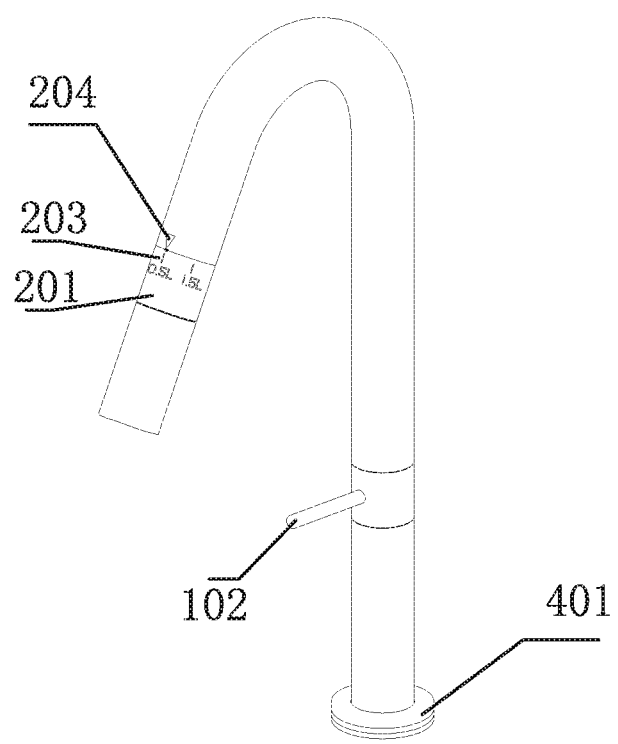
FIG. 4 illustrates a schematic diagram of the kitchen tap of the first embodiment of the present invention in rationed outlet mode.
Figure 5:
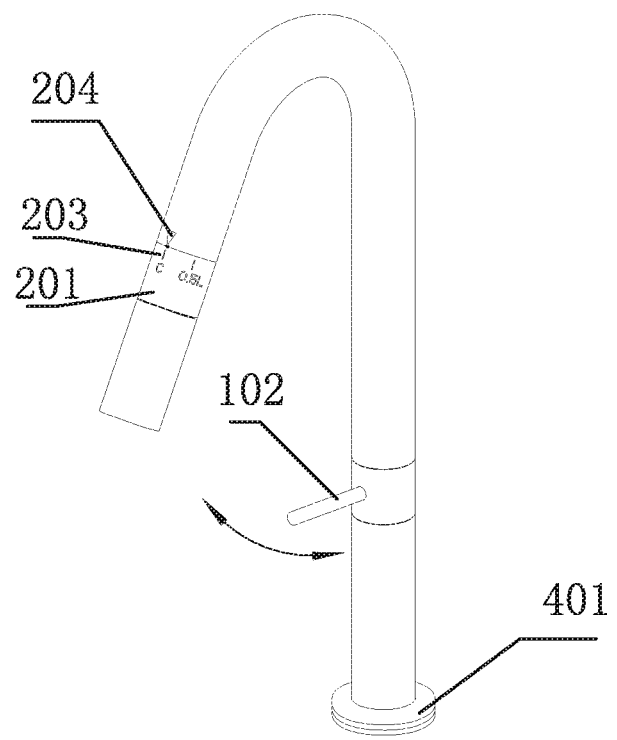
FIG. 5 illustrates a schematic diagram of the kitchen tap of the first embodiment of the present invention in unlimited outlet mode.

The present invention will be further described with the drawings and the embodiments.

The First Embodiment

Referring to FIGS. 1-5, a kitchen tap with rationed outlet port 2 is provided, the rationed water outlet device is disposed in a housing 1, with an outlet control switch 100, a volume option switch 200 and a process control module 300; the volume option switch 200 is connected to an encoder 301, the encoder 301 is disposed with an unlimited outlet gear 301a and a plurality of rationed outlet gears 301b. 301b', . . . ; the process control module 300 comprises an outlet valve 302, a flow meter 303 and a control chip 304; in this embodiment, the outlet valve 302 is an electromagnetic valve 302. The encoder 301 is electrically connected to the control chip 304 to send the flow volume gear information of the volume option switch 200 to the control chip 304. The control chip 304 is respectively electrically connected to the outlet control switch 100 and the electromagnetic valve 302, the outlet control switch 100 sends the flow volume on-off information to the control chip 304, so that the control chip 304 sends the electric signal to control the electromagnetic valve 302 to turn on or turn off, thus realizing water flowing or water stop.

When the volume option switch and the encoder 301 rotate to the unlimited outlet gear, the user needs to operate the outlet control switch again to turn on the electromagnetic valve, as it is in the unlimited outlet gear, the flow meter 303 would not count, the control chip 304 would not turn off the electromagnetic valve when the flow volume reaches to a certain value, therefore, if the user doesn't operate the outlet control switch again to turn off the electromagnetic valve 302, the water flowing would not stop, so that it realizes unlimited outlet function.

When the volume option outlet and the encoder 301 rotate to one rationed outlet gear, the user needs to operate the outlet control switch again to make the electromagnetic valve 302 turn on the outlet waterway. As it is in the rationed outlet gear, the control chip 304 obtains a target flow volume, the control chip 304 controls the flow meter 303 to count at the same time of outlet, when the flow meter counts to the target flow volume, the control chip 304 controls to turn off the electromagnetic valve 303 to stop water, so that it realizes rationed outlet function. As it applies with electrically operating, it ensures the accuracy of the counting.

Moreover, as the outlet control switch and the volume option switch are disposed independently, when the user selects the flow volume, he needs to turn on the outlet control switch, the two-step operation efficiently avoids misoperation.

In this embodiment, the volume option switch is a rotating ring 201 disposed at one side of the outlet portion of the tap, the rotating ring 201 is connected to the encoder 301 by a pair of lock catches 202, so that when rotating the rotating ring 201, the encoder 301 rotates in linking way. The rotating ring 201 is disposed with a volume dividing ruler 203, the outlet portion of the tap is disposed with a marker 204. The volume dividing ruler 203 is disposed with a scale C corresponding to the unlimited outlet gear and scales 0.5 L, 1 L etc. corresponding to the rationed outlet gears; when the rotating ring 201 rotates to make the scale of the volume dividing ruler 203 align with the marker 204, it indicates the present outlet flow volume.

When the rotating ring 201 rotates in the clockwise direction, the encoder 301 rotates to the unlimited outlet gear, the marker 204 aligns with the scale C of the volume dividing ruler 203, it indicates that the present outlet mode is unlimited outlet. When the rotating ring 201 rotates in the counter-clockwise direction, the encoder 301 rotates to one of the rationed outlet gear, the marker 204 aligns with one of the scales 0.5 L, 1 L, of the volume dividing ruler 203, it indicates that the present outlet mode is rationed outlet mode and the flow volume is what the marker 204 indicates.

In this embodiment, the outlet control switch comprises a touch induction switch 101 and a temperature control device, the temperature control device is a dial rod 102 in this embodiment, other devices, such as a handle, are available, only if it can control the temperature; the induction area of the touch induction switch 101 is disposed in the dial rod 102. When the encoder 301 is situated in the rationed outlet gear, water flows out by touching the dial rod. As the induction area of the touch induction switch 101 is small, it needs the user to touch correctly to touch off the outlet function. It thus avoids misoperation.

When the encoder 301 is situated in the unlimited outlet gear, the touch induction switch of the control chip 304 is invalid, at the same time, the dial rod 102 is valid. When rotating the dial rod 102 in the counter-clockwise direction, the control chip 304 make the electromagnetic turn on the outlet water, when continuing rotating the dial rod 102 in the counter-clockwise direction, the control chip 304 adjusts the mixing proportion of hot water and cool water to make the outlet temperature higher. The dial rod 102 is valid when in the unlimited outlet gear, the reason is that, in the rationed outlet mode, the flow volume is low, the temperature adjusting has hysteresis quality, therefore, it makes little sense to adjust the temperature in the low flow volume and rationed outlet mode. It should be noted that, as needed, the dial rod 102 can be available in the rationed mode and in the unlimited mode. The adjusting method of the dial rod 102 is not limited to the left-right rotating in this embodiment, it can be designed to up-down rotating, it wouldn't further describe hereafter.

It is in accord with the habit of the human being to dial the switch in the unlimited outlet gear, that is why the touch induction switch 101 is invalid when in the unlimited outlet gear, it should be noted that, the touch induction switch 101 can be configured to be available in the rationed mode and the unlimited mode.

Moreover, this embodiment further comprises a temperature indication unit 401 and a temperature sensor 402, the temperature indication unit 401 is an annular LED indication light at the tap base, when the outlet temperature rises, the temperature sensor 402 senses the outlet temperature and sends the information to the control chip 304, the control chip 304 makes the annular LED indication light transition between the red and blue light according to the outlet temperature. When the outlet temperature is at the lowest, the annular LED indication light shows blue light, when the outlet temperature is at the highest, the annular LED indication light shows red light. It uses significant color to indicate the outlet temperature, so that user can read the outlet temperature directly, it also makes the appearance attractive.

The Second Embodiment

Figure 6:
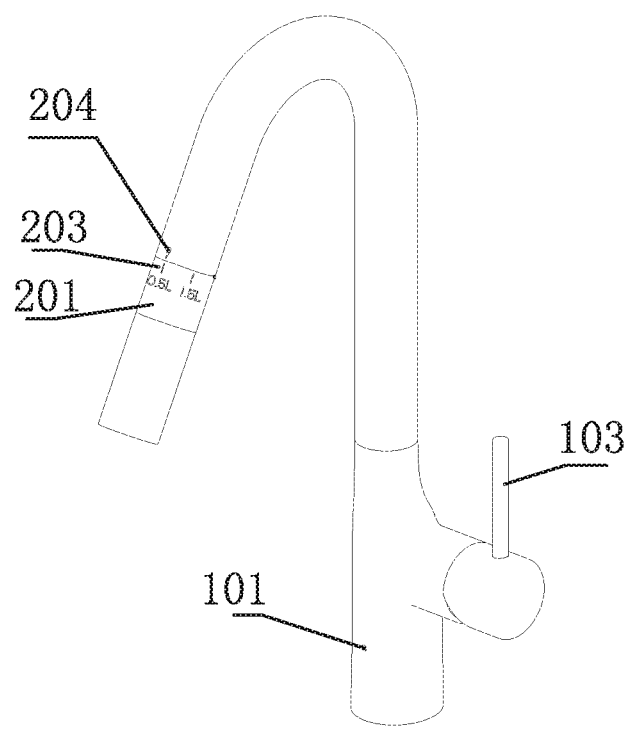
FIG. 6 illustrates a schematic diagram of a kitchen tap of the second embodiment of the present invention in rationed outlet mode.
Figure 7:
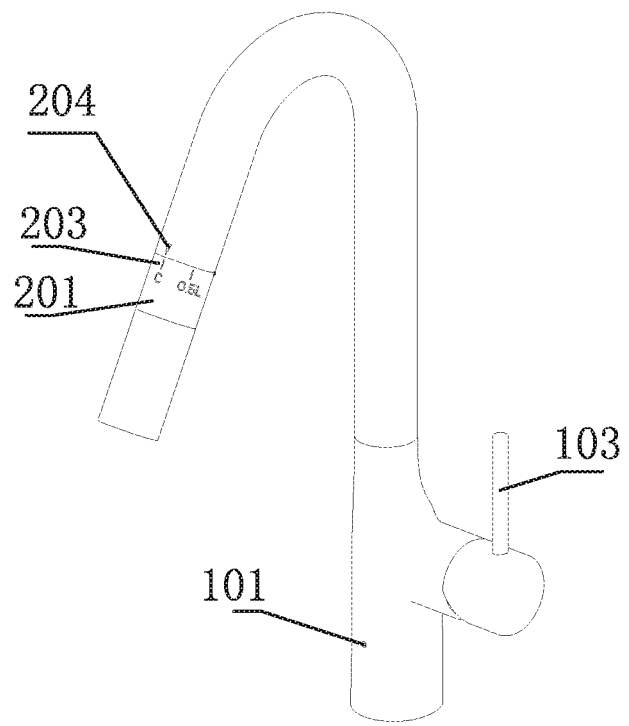
FIG. 7 illustrates a schematic diagram of the kitchen tap of the second embodiment of the present invention in unlimited outlet mode.
Figure 8:
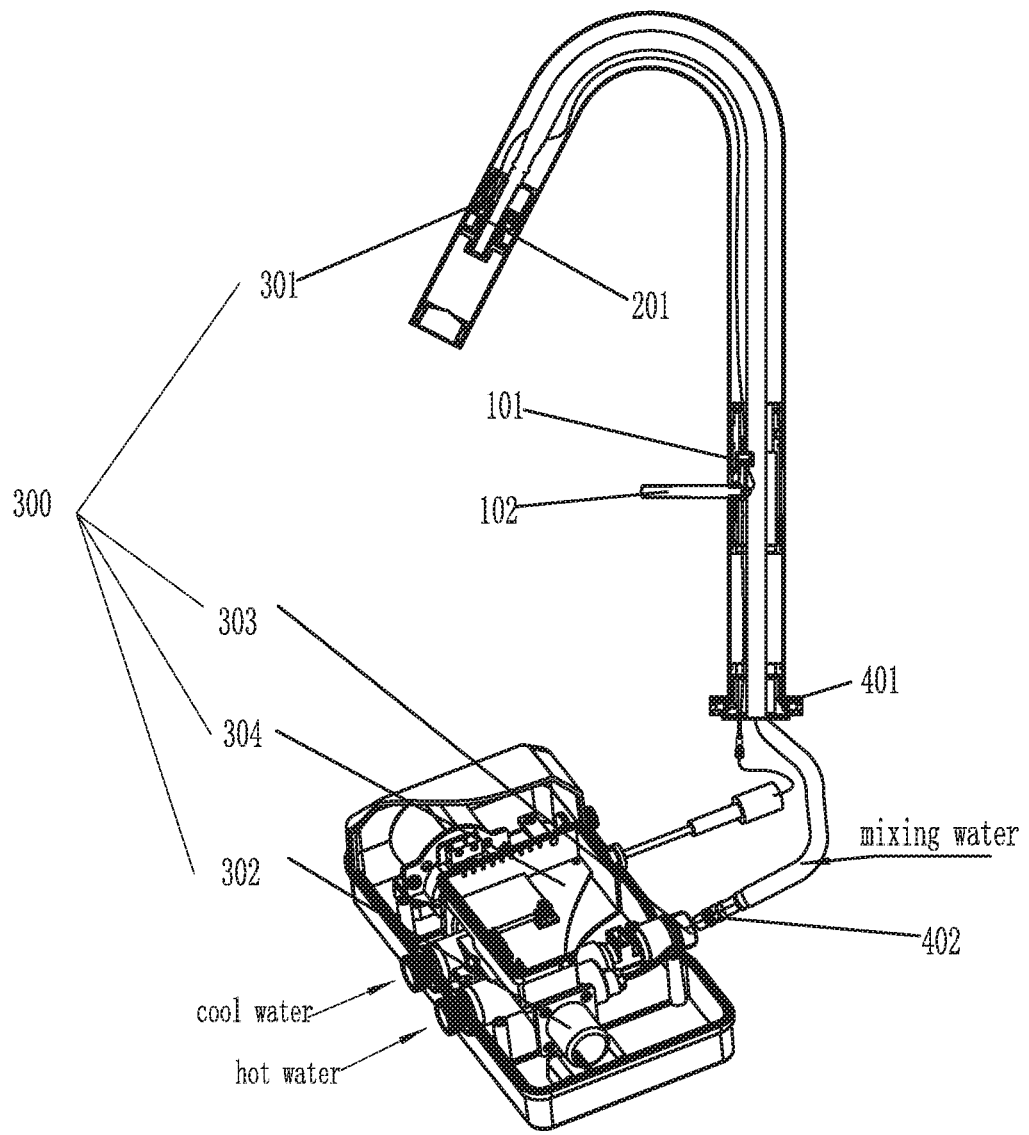
FIG. 8 is a combination of FIGS. 2 and 3 above that illustrates the assembled process control module.

Referring to FIG. 6 and FIG. 7, this embodiment differs from the first embodiment in that: the temperature control device is removed, a mechanical outlet switch 103 is added; when the encoder 301 is situated in the unlimited outlet gear, the touch induction switch 101 and the process control module are invalid, the outlet tap is a traditional mechanical tap, rotating the mechanical outlet switch 103 can make the tap outlet, continuing rotating the mechanical outlet switch 103 can increase the flow volume; lifting the mechanical outlet switch 103 can increase the outlet temperature. This mechanically operating method is more in accord with the traditional habit, it also ensures that the outlet can be controlled by the mechanical switch when the electric system is in the event of a failure.

In this embodiment, the tap is disposed with a touch induction window at the support section, the touch induction switch 101 is disposed at the position in the tap and corresponding to the touch induction window. The touch induction window can be disposed at other position of the tap, which is a simple substitution.

The Third Embodiment

This embodiment differs from the first embodiment and the second embodiment in that: the outlet device is a shower head but not a tap, the principle and the basic structure are similar, it only needs to design the shower head structure.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A rationed water outlet device with a variable water flow volume, comprising:
   a process control module that communicates with the water source and that comprises an outlet valve, a flow meter, a control chip, and an encoder that includes an unlimited outlet gear and a plurality of rationed outlet gears which are switchably connected to the outlet valve to provide respectively, when engaged, an unlimited water flow volume or a selected rationed water flow volume from among a plurality of rationed water flow volumes, and that is connected to the control chip to provide gear selection information;
   a volume option switch that is rotatably linked to the encoder for engaging the unlimited outlet gear or one rationed outlet gear of the plurality of rationed outlet gears for a user to select the unlimited water flow volume or the selected rationed water flow volume; and
   an outlet control switch that is independent of the volume option switch and that is engaged after the volume option switch is engaged.

2. The rationed water outlet device according to claim 1, wherein the rationed water outlet device includes an outlet portion provided with a marker, and wherein the volume option switch is a rotating ring disposed at one side of the outlet portion of the rationed water outlet device and disposed with a volume dividing ruler to facilitate volume selection by alignment with the marker.

3. The rationed water outlet device according to claim 2, wherein, when the volume option switch rotates to one side, the encoder rotates to the unlimited outlet gear; and, when the volume option switch rotates to another side, the encoder rotates to one rationed outlet gear of the plurality of rationed outlet gears.

4. The rationed water outlet device according to claim 2, wherein the volume dividing ruler of the rotating ring of the volume option switch is disposed with a scale corresponding to the unlimited outlet gear and a plurality of scales corresponding to respective ones of the plurality of rationed outlet gears so that, when the rotating ring rotates to make one of the scales align with the marker of the outlet portion of the rationed water outlet device, a corresponding outlet gear is selected.

5. The rationed water outlet device according to claim 1, wherein the outlet control switch comprises a touch induction switch so that, when the encoder is disposed in one rationed outlet gear of the plurality of rationed outlet gears, the outlet valve of the process control module is opened by touching the touch induction switch and, at the same time, the flow meter of the process control module starts to count and, when the flow volume reaches a set value of said one rationed outlet gear, the control chip of the process control module controls the outlet valve of the process control module to turn off water flow from the rationed water outlet device.

6. The rationed water outlet device according to claim 5, wherein the outlet control switch further comprises a temperature control device.

7. The rationed water outlet device according to claim 6, wherein the temperature control device is a dial rod and the touch induction switch has a touch area that is disposed in the dial rod, and wherein the control chip receives cool water and hot water from the water source and adjusts a mixing proportion of the cool water and the hot water by adjusting the position of the dial rod so as to control outlet temperature of the water flowing out of the rationed water outlet device.

8. The rationed water outlet device according to claim 7, wherein, when the encoder is situated in the unlimited outlet gear, the touch induction switch is inoperative and the outlet valve of the process control module is turned on by rotating the dial rod, and the outlet temperature becomes higher by continuously rotating the dial rod.

9. The rationed water outlet device according to claim 6, wherein a temperature indication unit and a temperature sensor are further provided so that, when the outlet temperature becomes higher, color of the temperature indication unit gradually transitions from blue to red.

10. The rationed water outlet device according to claim 5, wherein the outlet control switch further comprises a mechanical outlet switch so that, when the encoder is situated in the unlimited outlet gear, the touch induction switch and the proceed control module are respectively inoperative and outlet flow volume and outlet temperature are adjusted by operating the mechanical outlet switch.

11. The rationed water outlet device according to claim 10, wherein the rationed water outlet device is disposed with an induction window, and wherein the induction switch is disposed at a position in the rationed water outlet device corresponding to the induction window.

12. The rationed water outlet device according to claim 1, wherein the rationed water outlet device is a kitchen tap or a shower head.

* * * * *